United States Patent
Baldassarre et al.

(10) Patent No.: US 12,141,025 B2
(45) Date of Patent: Nov. 12, 2024

(54) SELF-HEALING IN CONTAINER ORCHESTRATION SYSTEMS

(71) Applicant: Accenture Global Solutions Limited, Dublin (IE)

(72) Inventors: Emanuele Baldassarre, Bari (IT); Rino Guglietta, Fondi (IT); Alessio Bianchini, Rome (IT)

(73) Assignee: Accenture Global Solutions Limited, Dublin (IE)

(*) Notice: Subject to any disclaimer, the term of this patent is extended or adjusted under 35 U.S.C. 154(b) by 1 day.

(21) Appl. No.: 18/180,328

(22) Filed: Mar. 8, 2023

(65) Prior Publication Data
US 2024/0070012 A1    Feb. 29, 2024

(30) Foreign Application Priority Data
Aug. 31, 2022   (IT) .................. 102022000017886

(51) Int. Cl.
*G06F 11/07* (2006.01)
(52) U.S. Cl.
CPC ...... *G06F 11/0793* (2013.01); *G06F 11/0721* (2013.01)
(58) Field of Classification Search
CPC .................. G06F 11/0793; G06F 11/0721
See application file for complete search history.

(56) References Cited

U.S. PATENT DOCUMENTS

| | | | |
|---|---|---|---|
| 7,287,193 B2 * | 10/2007 | Ward ................ | H04L 41/12 370/216 |
| 11,038,821 B1 | 6/2021 | Harding et al. | |
| 2015/0154079 A1 * | 6/2015 | Lightner ............. | G06F 11/2041 714/4.11 |
| 2020/0042406 A1 | 2/2020 | Natanzon et al. | |
| 2020/0310658 A1 * | 10/2020 | Singh .................. | H04L 67/1097 |

OTHER PUBLICATIONS

GitHub.com [online], "kubernetes / node-problem-detector," available on or before Jun. 25, 2017 via Internet Archive: Wayback Machine URL<https://web.archive.org/web/20170625071854/https://github.com/kubernetes/node-problem-detector>, retrieved on Mar. 29, 2023, retrieved from URL<https://github.com/kubernetes/node-problem-detector>, 12 pages.

GitHub.com [online], "planetlabs / draino," available on or before Dec. 2, 2020 via Internet Archive: Wayback Machine URL<https://web.archive.org/web/20201202005052/https://github.com/planetlabs/draino>, retrieved on Mar. 29, 2023, retrieved from URL<https://github.com/planetlabs/draino>, 7 pages.

Search Report and Written Opinion in Italian Appln. No. 102022000017886, dated Mar. 16, 2023, 9 pages.

* cited by examiner

*Primary Examiner* — Nadeem Iqbal
(74) *Attorney, Agent, or Firm* — Polsinelli PC

(57) ABSTRACT

Methods, systems, and computer-readable storage media for receiving, by a self-healing platform within the container orchestration system, fault data that is representative of two or more error events occurring within a cluster provisioned within the container orchestration system, determining, by the self-healing platform, a set of actions to be executed in response to the two or more error events, providing, by the self-healing platform, a priority value for each error event of the two or more error events, and transmitting, by the self-healing platform, instructions to execute actions in the set of actions based on respective priority values of the two or more error events.

18 Claims, 4 Drawing Sheets

SELF-HEALING IN CONTAINER ORCHESTRATION SYSTEMS

CROSS-REFERENCE TO RELATED APPLICATION

This application claims priority to Italian App. No. 102022000017886 filed on Aug. 31, 2022, the disclosure of which is expressly incorporated herein by reference in the entirety.

BACKGROUND

In modern software deployments, containerization is implemented, which can be described as operating system (OS) virtualization. In containerization, applications (or microservices, software processes) are run in isolated user spaces referred to as containers. The containers use the same shared OS, and each provides a fully packaged and portable computing environment. That is, each container includes everything an application needs to execute (e.g., binaries, libraries, configuration files, dependencies). Because a container is abstracted away from the OS, containerized applications can execute on various types of infrastructure. For example, using containers, an application can execute in any of multiple cloud-computing environments.

Container orchestration automates the deployment, management, scaling, and networking of containers within cloud platforms. For example, container orchestration systems, in hand with underlying containers, enable applications to be executed across different environments (e.g., cloud computing environments) without needing to redesign the application for each environment. Enterprises that need to deploy and manage a significant number of containers (e.g., hundreds or thousands of containers) leverage container orchestration systems. An example container orchestration system is the Kubernetes platform, maintained by the Cloud Native Computing Foundation, which can be described as an open-source container orchestration system for automating computer application deployment, scaling, and management. In container orchestration systems, such as Kubernetes, clusters include physical hardware (e.g., servers, processors, memory) that execute applications (e.g., instances of services).

Applications are executed within container orchestration systems to support enterprise operations. Example applications can include, without limitation, enterprise resources planning (ERP) applications, information technology (IT) applications, human capital management (HCM) applications, customer relationship management (CRM) applications, and the like. In the context of Kubernetes, a cluster can execute one or more instances of an application using a pod, which is the smallest deployable unit in Kubernetes. However, faults can occur within container orchestration systems that can result in applications being taken offline and enterprise operations being disrupted. Detecting occurrence of faults, determining types of faults, and resolving faults are time- and resource-consuming tasks. In traditional systems, such tasks are performed using an array of individual tools that have to be cross-checked and manually tracked in order to bring the system to a desired state. This results in inefficiencies that compound time and resource consumption.

SUMMARY

Implementations of the present disclosure are directed to self-healing platform in container orchestration systems. More particularly, and as described in further detail herein, implementations of the present disclosure provide a self-healing platform that includes a logic layer in container orchestration systems that enable prioritized recovery of applications executed across multiple clusters. In some examples, the self-healing platform identifies potential issues and proactively addresses potential issues before actual occurrence.

In some implementations, actions include receiving, by a self-healing platform within the container orchestration system, fault data that is representative of two or more error events occurring within a cluster provisioned within the container orchestration system, determining, by the self-healing platform, a set of actions to be executed in response to the two or more error events, providing, by the self-healing platform, a priority value for each error event of the two or more error events, and transmitting, by the self-healing platform, instructions to execute actions in the set of actions based on respective priority values of the two or more error events. Other implementations of this aspect include corresponding systems, apparatus, and computer programs, configured to perform the actions of the methods, encoded on computer storage devices.

These and other implementations can each optionally include one or more of the following features: determining, by the self-healing platform, a set of actions to be executed in response to the two or more error events comprises processing the fault data through a machine learning (ML) model, which provides actions in the set of actions as output; actions in the set of actions include actions to remediate a fault that has occurred within the cluster; actions in the set of actions include actions to pre-empt a predicted fault from occurring within the cluster; the actions in the set of actions are determined at least partially based on processing the fault data through a ML model, which provides actions in the set of actions as output; each priority value includes one or more of a designated priority value and a usage-based priority value; and execution of actions in the set of actions includes draining a faulty node, providing a new node, and configuring the new node based on a target configuration.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the

DESCRIPTION OF DRAWINGS

Like reference symbols in the various drawings indicate like elements.

DETAILED DESCRIPTION

Figure 1:
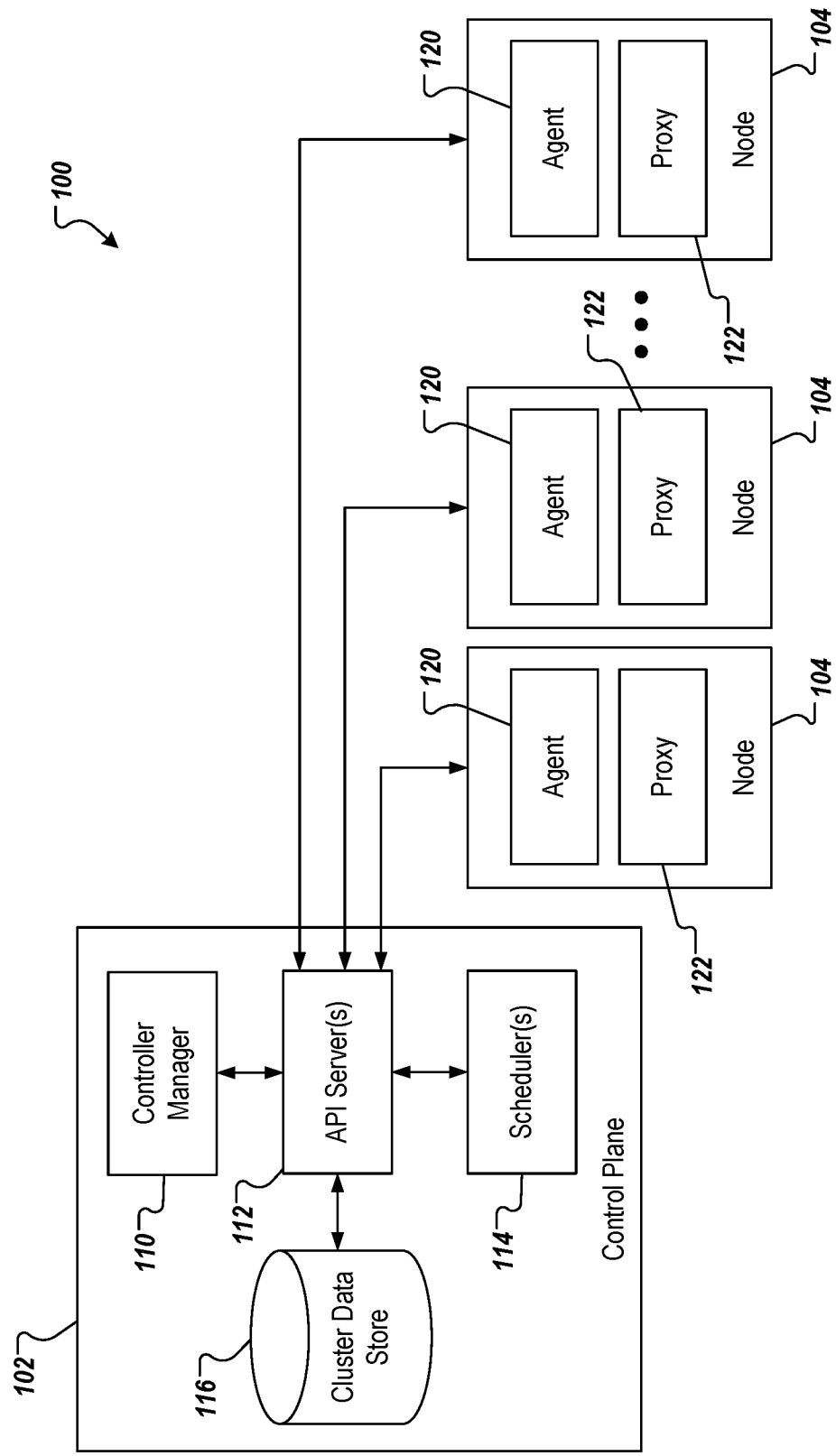
FIG. 1 depicts an example container orchestration architecture.

Implementations of the present disclosure are directed to self-healing platform in container orchestration systems. More particularly, and as described in further detail herein, implementations of the present disclosure provide a self-healing platform that includes a logic layer in container orchestration systems that enable prioritized recovery of applications executed across multiple clusters. In some examples, the self-healing platform identifies potential issues and proactively addresses potential issues before actual occurrence.

In some implementations, actions include receiving, by a self-healing platform within the container orchestration system, fault data that is representative of two or more error events occurring within a cluster provisioned within the container orchestration system, determining, by the self-healing platform, a set of actions to be executed in response to the two or more error events, providing, by the self-healing platform, a priority value for each error event of the two or more error events, and transmitting, by the self-healing platform, instructions to execute actions in the set of actions based on respective priority values of the two or more error events.

As described in further detail herein, implementations of the present disclosure provides example functionality including, but not limited to: adding clusters to manage, checking the status of event errors within clusters, setting priorities per cluster per application, retrieving results of configuration analysis and known error correlation (e.g., using a self-healing engine), retrieving configurations, retrieving event errors that are generated, retrieving map and priority (e.g., from a prioritization engine), checking events that need drains with cluster(s) of target application(s), checking which node has priority (e.g., using the self-healing engine), issuing instructions to nodes to execute draining based on priority, recognizing periodic faults and matching such faults with common configurations that can cause the faults and creating an error catalogue to record the faults and respective configurations, managing a priority queue of application pods and respective criticalities, providing (e.g., to a self-healing dashboard) detection of known configurations that can result in resilience issue (e.g., faults), providing instructions for container replacement, container restart, and node creation, and notification of the residual outages resulting from automated actions.

To provide further context for implementations of the present disclosure, and as introduced above, in modern software deployments containerization is implemented, which can be described as operating system (OS) virtualization. In containerization, applications (or microservices, software processes) are run in isolated user spaces referred to as containers. The containers use the same shared OS, and each provides a fully packaged and portable computing environment. That is, each container includes everything an application needs to execute (e.g., binaries, libraries, configuration files, dependencies). Because a container is abstracted away from the OS, containerized applications can execute on various types of infrastructure. For example, using containers, an application can execute in any of multiple cloud-computing environments.

Container orchestration automates the deployment, management, scaling, and networking of containers. For example, container orchestration systems, in hand with underlying containers, enable applications to be executed across different environments (e.g., cloud computing environments) without needing to redesign the application for each environment. Enterprises that need to deploy and manage a significant number of containers (e.g., hundreds or thousands of containers) leverage container orchestration systems. An example container orchestration system is the Kubernetes platform, maintained by the Cloud Native Computing Foundation, which can be described as an open-source container orchestration system for automating computer application deployment, scaling, and management. In container orchestration systems, such as Kubernetes, clusters include physical hardware (e.g., servers, processors, memory) that execute applications (e.g., instances of services).

Applications are executed within container orchestration systems to support enterprise operations. Example applications can include, without limitation, enterprise resources planning (ERP) applications, information technology (IT) applications, human capital management (HCM) applications, customer relationship management (CRM) applications, and the like. In the context of Kubernetes, a cluster can execute one or more instances of an application using a pod, which is the smallest deployable unit in Kubernetes. However, faults can occur within container orchestration systems that can result in applications being taken offline and enterprise operations being disrupted. Detecting occurrence of faults, determining types of faults, and resolving faults are time- and resource-consuming tasks. In traditional systems, such tasks are performed using an array of individual tools that have to be cross-checked and manually tracked in order to bring the system to a desired state. This results in inefficiencies that compound time and resource consumption.

In view of the above context, implementations of the present disclosure provide a self-healing platform in container orchestration systems that enables prioritized recovery of applications executed across multiple clusters. In some examples, the self-healing platform identifies potential issues and proactively addresses potential issues before actual occurrence. As described in further detail herein, the self-healing platform enables different priorities to be assigned to applications and recovery schemas to be defined. The self-healing platform enables central management of distributed multi-cluster deployments and provides a holistic view including impact on and risk to enterprise operations. Implementations of the present disclosure further provide a metric, referred to herein as recover objective (RO) metric, which is used to identify what parts of enterprise operations are to be recovered under specific recovery time objectives (RTOs) and/or recovery point objectives (RPOs). Implementations of the present disclosure further provide one or more machine learning (ML) models that are trained to determine next best action (NBAs) that can be executed to proactively mitigate issues before they occur.

FIG. 1 depicts an example container orchestration architecture 100 in accordance with implementations of the present disclosure. In the depicted example, the example container orchestration architecture 100 represents deployment of a portion of a container orchestration system, Kubernetes introduced above. More particularly, the example architecture 100 represents a basic structure of a cluster within Kubernetes In the example of FIG. 1, the example architecture 100 includes a control plane 102 and a plurality of nodes 104. Each node 104 can represent physical worker machines and are configured to host pods. For example, nodes 104 can include VMs, servers, and other entities with computational power for containers and pods to run in. In Kubernetes, a pod is the smallest deployable unit of resources and each pod is provided as one or more containers with shared storage/network resources, and a specification for how to run the containers. In some examples, a pod can be referred to as a resource unit that includes an application container. The control plane 102 communicates with the nodes 104 and is configured to manage all of the nodes 104 and the pods therein.

In further detail, the control plane 102 is configured to execute global decisions regarding the cluster as well as detecting and responding to cluster events. In the example of FIG. 1, the control plane 102 includes a control manager 110, one or more application programming interface (API) server(s) 112, one or more scheduler(s) 114, and a cluster data store 116. The API server(s) 112 communicate with the nodes 104 and exposes the API of Kubernetes to exchange information between the nodes 104 and the components in the control plane 102 (e.g., the cluster data store 116). In some examples, the control plane 102 is set with more than one API server(s) 112 to balance the traffic of information exchanged between the nodes 104 and the control plane 102. The scheduler(s) 114 monitor the nodes 104 and execute scheduling processes to the nodes 104. For example, the scheduler(s) 114 monitors events related to newly created pods and selects one of the nodes 104 for execution, if the newly created pods are not assigned to any of the nodes 104 in the cluster.

The cluster data store 116 is configured to operate as the central database of the cluster. In this example, resources of the cluster and/or definition of the resources (e.g., the required state and the actual state of the resources) can be stored in the cluster data store 116. The controller manager 110 of the control plane 102 communicates with the nodes 104 through the API server(s) 112 and is configured to execute controller processes. The controller processes can include a collection of controllers and each controller is responsible for managing at least some or all of the nodes 104. The management can include, but is not limited to, noticing and responding to nodes when an event occurs, and monitoring the resources of each node (and the containers in each node). In some examples, the controller in the controller manager 110 monitors resources stored in the cluster data store 116 based on definitions of the resource. As introduced above, the controllers also verify whether the actual state of each resource matches the required state. The controller is able to modify or adjust the resources, so that actual state matches the required state depicted in the corresponding definition of the resources.

In the example of FIG. 1, each node 104 includes an agent 120 and a proxy 122. The agent 120 is configured to ensure that the containers are appropriately executing within the pod of each node 104. The agent 120 is referred to as a kubelet in Kubernetes. The proxy 122 of each node 104 is a network proxy that maintains network rules on nodes 104. The network rules enable network communication to the pods in the nodes 104 from network sessions inside or outside of the cluster. The proxy 122 is a kube-proxy in Kubernetes.

Figure 2:
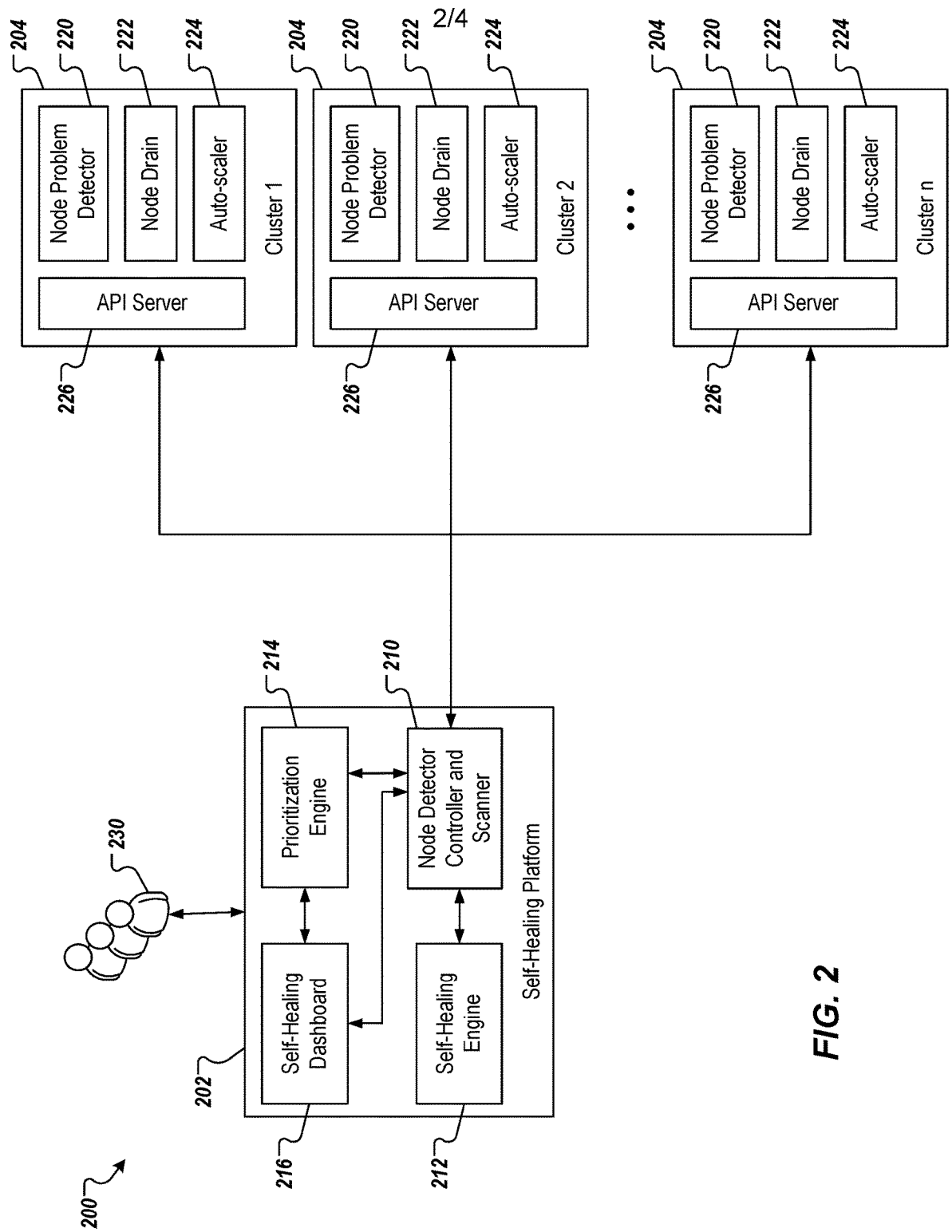
FIG. 2 depicts an example architecture that can be used to execute implementations of the present disclosure.

FIG. 2 depicts an example architecture 200 that can be used to execute implementations of the present disclosure. The example of FIG. 2 represents a container orchestration system including a self-healing platform 202 and clusters 204. In the example of FIG. 2, the self-healing platform 202 includes a node detector controller and scanner 210, a self-healing engine 212, a prioritization engine 214, and a self-healing dashboard 216. In some examples, each cluster 204 includes a node problem detector 220, a node drain 222, an auto-scaler 224, and an application programming interface (API) server 226. In some examples, one or more users 230 communicate with the self-healing platform 202. For example, each user 230 can provide data to and/or receive data from the self-healing platform 202 (e.g., using a client-side computing device).

In some examples, the clusters 204 execute applications. Applications can be executed to perform and/or support operations of an enterprise. Example applications can include, without limitation, ERP applications, IT applications, HCM applications, CRM applications, and the like. In the context of Kubernetes, a cluster 204 can execute one or more instances of an application using a pod, which is the smallest deployable unit in Kubernetes.

In some implementations, each cluster 204 can be any appropriate type of cluster. That is, the self-healing platform 202 of the present disclosure can interact with any appropriate type of cluster to perform self-healing functionality, as described in further detail herein. For example, and without limitation, a first cluster can be a development cluster, within which one or more applications can be developed, a second cluster can be a testing cluster, within which one or more applications are tested before deployment, and a third cluster can be a production cluster, within which one or more applications are executed for production use.

In some examples, the node detector controller and scanner 210 connects to the clusters 204 through calls to the respective API servers 226. The node detector controller and scanner 210 retrieves configuration data representative of configurations of respective clusters 204. The node detector controller and scanner 210 receives error events published by clusters 204. The node detector controller and scanner 210 retrieves a map and operations priority from the prioritization engine 214. In some implementations, the node detector controller and scanner 210 provides data to the self-healing engine 212, which data includes one or more of the configurations, error events, map, and operations priority. In some examples, the node detector controller and scanner 210 identifies events that need worker node drains from the clusters 204. In some examples, the node detector controller and scanner 210 receives priority data from the self-healing engine to determine which worker node has priority.

As described in further detail herein, the node detector controller and scanner 210 transmits instructions to clusters 204 to selectively execute draining based on priority (e.g., instruct the node problem detector 220 and the node drain 222 to execute prioritize draining). For example, draining of one or more nodes can be triggered based on types of error events (e.g., permanent and non-recoverable events triggers draining of nodes. Node draining enables containers to be moved from one node to another node.

In some implementations, the self-healing engine 212 processes data received from the node detector controller and scanner 210 to determine actions that are to be executed to resolve errors that have occurred and/or to prevent errors from occurring. In some examples, the self-healing engine 212 engine includes one or more ML models that are used to process the data to provide output data that can be used to execute self-healing within the clusters 204. In some examples, the self-healing engine 212 processes data received from the node detector controller and scanner 210 to identify occurrences of faults and match each fault with a configuration that can cause the respective fault. For example, fault data can be provided as input to a ML model, which processes the fault data to provide a configuration as output data. In some examples, the self-healing engine 212 creates an error catalogue that matches faults to configurations causing the faults. In some examples, the self-healing engine 212 manages a priority queue of pods and their respective criticality that is used to selectively execute draining based on priority. In some examples, output data of the self-healing engine 212 can be displayed through the self-healing dashboard 216 to inform users 230 on the detection of known configurations that can cause resilience issues.

In some examples, the node problem detector 220 is provided within each node of a respective cluster 204. The node problem detector 220 is provided as a daemon that detects problems within a respective node and reports any problems through the API server 226. In the example of FIG. 2, the node problem detector 220 reports any errors (also referred to herein as faults) to the self-healing platform 202 through the API server 226. Example errors can include, without limitation, infrastructure daemon issues (e.g., ntp service down), hardware issues (e.g., bad CPU, memory, disk), kernel issues (e.g., kernel deadlock, corrupted file system), and container runtime issues (e.g., unresponsive runtime daemon). In some examples, the node drain 222 (e.g., draino in Kubernetes) automatically drains nodes based on labels and conditions. For example, draining can include the node drain 222 matching nodes to labels and conditions, and cordons any nodes that meet the labels and at least one condition. In this manner, new pods cannot be instantiated at such nodes. Further, the node drain 222 drains pods from such nodes (e.g., after expiration of a configurable drain-buffer time). In some examples, the node problem detector 220 can set a node condition when it detects something wrong with a node (e.g., by monitoring node logs), and the auto-scaler 224 is configured to delete nodes that are underutilized.

As depicted in FIG. 2, the self-healing platform 202 of the present disclosure resides outside of the clusters 204. In this manner, implementing the self-healing platform 202 is non-intrusive with respect to the clusters 204 and does not consume resources of any particular cluster 204. Further, the components (e.g., the node problem detector 220, the node drain 222, the auto-scaler 224, the API server 226) of the clusters 204 are typical components already provisioned within clusters. Consequently, implementations of the present disclosure do not require additional components to be provisioned within any cluster, thereby conserving resources, while providing the self-healing functionality described herein. Instead, and as described herein, the self-healing platform 202 of the present disclosure retrieves data provided by the node problem detector 220 through the API server 226, performs self-healing functionality described herein (e.g., node handling priority, preemptive addressing of predicted faults), and transmits instructions to a cluster 204 for execution by components already provisioned within the cluster 204 (e.g., the node drain 222, the auto-scaler 224).

As introduced above, and in accordance with implementations of the present disclosure, instantiating new nodes and draining of nodes have errors is based on prioritization. In some examples, priority can include designated priority and/or usage-based priority.

In some implementations, and with reference to designated priority, one or more applications can be associated with a designated priority level. For example, a user 230 can access a list of applications through a dashboard (e.g., the self-healing dashboard 216) and can assign a priority to each application. In some examples, the designated priority level represents an urgency with which any fault (e.g., error in a node) should be remedied to mitigate interruption to the respective application.

In some implementations, and with reference to usage-based priority, one or more applications can be associated with a usage-based priority level. For example, a usage history of an application can be determined and a usage-based priority level assigned based on the usage-history. In some examples, the usage-based priority level represents an urgency with which any fault (e.g., error in a node) should be remedied to mitigate interruption to the respective application. In some examples, the usage history represents a frequency with which the application is used. More frequently used applications can be assigned a higher priority to ensure availability and mitigate any consequences of lack of availability (e.g., falling below required service level agreements (SLAs)).

In some examples, a frequency determined from the usage history can be compared to multiple threshold frequencies and the usage-based priority level can be determined based on the comparisons. For example, if the frequency exceeds a first threshold frequency, a first usage-based priority can be assigned, if the frequency exceeds a second threshold frequency, but is below the first threshold frequency, a second usage-based priority can be assigned, and if the frequency is below the second threshold frequency, a third usage-based priority can be assigned. In this example, the first usage-based priority is higher than the second usage-based priority, and the second usage-based priority is higher than the third usage-based priority.

In some implementations, a designated priority of an application can take precedence over (can override) a usage-based priority of the application. For example, an application can be assigned a designated priority that is greater than a usage-based priority. This can occur in a scenario where the application is less frequently used, but the particular functionality of the application is of importance.

To illustrate implementations of the present disclosure, and by way of non-limiting example, a first application can be assigned a first priority (e.g., a designated priority) and a second application can be assigned a second priority (e.g., a designated priority), the first priority being higher than the second priority. In this example, if a first node affecting the first application and a second node affecting the second application can be in the same cluster and both have errors. In this example, the first node will be addressed, then the second node. For example, and as described herein, the node detector controller and scanner 210 can transmit instructions to the cluster 204 (within which the first node and the second node are provisioned) to instruct that the first node is to be handled before the second node. In response, the node drain 222 of the cluster 204 can drain the first node, instantiating a new node and moving pods for the first application, as described in further detail herein. Subsequently, the node drain 222 of the cluster 204 can drain the second node, instantiating a new node and moving pods for the second application. In this manner, priority-based handling of faulty nodes overrides any default handling provided within the container orchestration system.

As introduced above, and in accordance with implementations of the present disclosure, the self-healing engine 212 engine includes one or more ML models that are used to process the data to provide output data that can be used to execute self-healing within the clusters 204. As noted above, in some examples, fault data can be provided as input to a ML model, which processes the fault data to provide a configuration as output data (target configuration). In some examples, configuration can include a type of VM, type and quantity of resources (e.g., processors, memory) made available in the node, and/or a software version (e.g., of OS executing on the node). In some examples, the target configuration can be compared to a current configuration to provide a configuration delta. In some examples, the configuration delta can indicate configuration changes that are to be executed to bring the current configuration to the target configuration. Example changes can include, without limitation, moving the application to a new node that has the type and quantity of resources (e.g., processors, memory) indicated in the target configuration, updating software executing in the node, and patching software executing in the node.

In some examples, the target configuration can represent a configuration of nodes and/or a cluster that can be used to remedy a fault. In some examples, the target configuration can be used to configure a new node that pods for the application are moved to, the faulty node being drained.

In some examples, the target configuration can represent a configuration of nodes and/or a cluster that can be used to prevent a fault that is predicted to occur. For example, a ML model can predict one or more faults that have some likelihood of occurrence within a node and/or a cluster. In some examples, the ML model is trained using training data representative of multiple series of faults that can indicate fault patterns (e.g., after a first fault, a second fault occurs as a result). In some examples, the output data of the ML model includes one or more faults having a likelihood of occurrence that exceeds a threshold likelihood. For example, the ML model can predict that a fault is to occur with a likelihood of X (e.g., X=[0, 1]). If the likelihood exceeds a threshold likelihood, the output data indicates the predicted fault and provides a target configuration that represents a configuration of nodes and/or a cluster that can be used to prevent the predicted fault. If the likelihood does not exceed the threshold likelihood, the output data does not indicate the fault or a target configuration therefor. In this manner, faults that have less than the threshold likelihood of occurring are not addressed, thereby conserving resources and avoiding potential downtime (unavailability) of applications.

Figure 3:
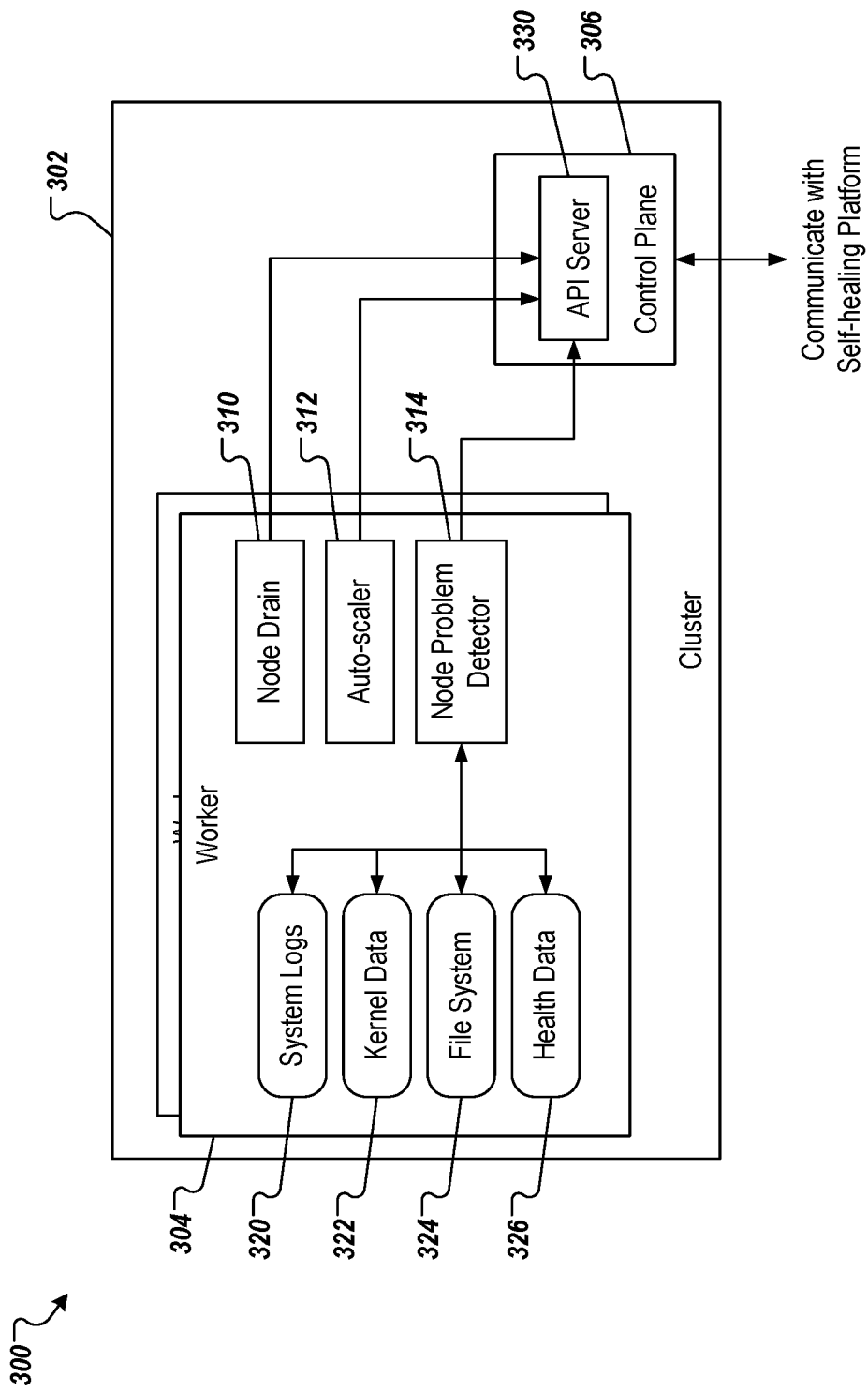
FIG. 3 depicts an example architecture that can be used to execute implementations of the present disclosure.

FIG. 3 depicts an example architecture 300 that can be used to execute implementations of the present disclosure. The example architecture of 300 provides further detail of a cluster 302 of a container orchestration system, such as a cluster 204 of FIG. 2. In the example of FIG. 3, the cluster includes workers 304 and a control panel 306. Each worker 304 includes a node drain 310, an auto-scaler 312, and a node problem detector 314. In some examples, each worker 304 includes system logs 320, kernel data 322, file system data 324, and health data. In some examples, the control plane 306 includes an API server 330.

Implementations of self-healing executed by the self-healing platform of the present disclosure are described in further detail with reference to the example of FIG. 3. In some implementations, the node problem detector 314 polls the system logs 320 to detect predefined permanent or temporary error conditions. In some examples, a match is made using a predefined list of known error types that can be extended (e.g., using a configuration map). In some implementations, the node problem detector 314 checks the kernel data 322 for any data representative of kernel issues (e.g., deadlocks). In some implementations, the node problem detector 314 checks the file system 324 to determine a status thereof (e.g., file system status transition to read-only). In some implementations, the node problem detector 314 checks the health status of configured processes (e.g., kubelet, containerd, dockerd) and anomalous continuous restart of core processes. In some examples, any errors detected by the node problem detector 314 are reported to the API server 330. In some examples, errors can include permanent errors (e.g., NodeCondition) and temporary errors (e.g., Event).

In some implementations, the node drain 310 polls the API server 330 to receive identifiers of nodes having a permanent error status. In response, the node drain 310 cordons each node to prevent any new pods from being placed on the node and starts a process to evict the node (e.g., move pods to other node(s) and shutdown the node). In some examples, such a node is cordoned by marking the node as cordoned. In some examples, such a node is cordoned only if one or more eviction conditions are met. An example eviction condition can include less than 2 out of 5 pods being moved. If the condition is not met, cordoning of the node is deemed to have failed and a retry is triggered. In some examples, only one node is cordoned at a time. In some implementations, the auto-scaler 312 polls nodes that have a status of cordoned (i.e., nodes marked as cordoned). In some examples, for each node that is cordoned, the auto-scaler 312 adds a new node, instantiates pods of the cordoned node on the new node, and terminates the cordoned node.

Figure 4:
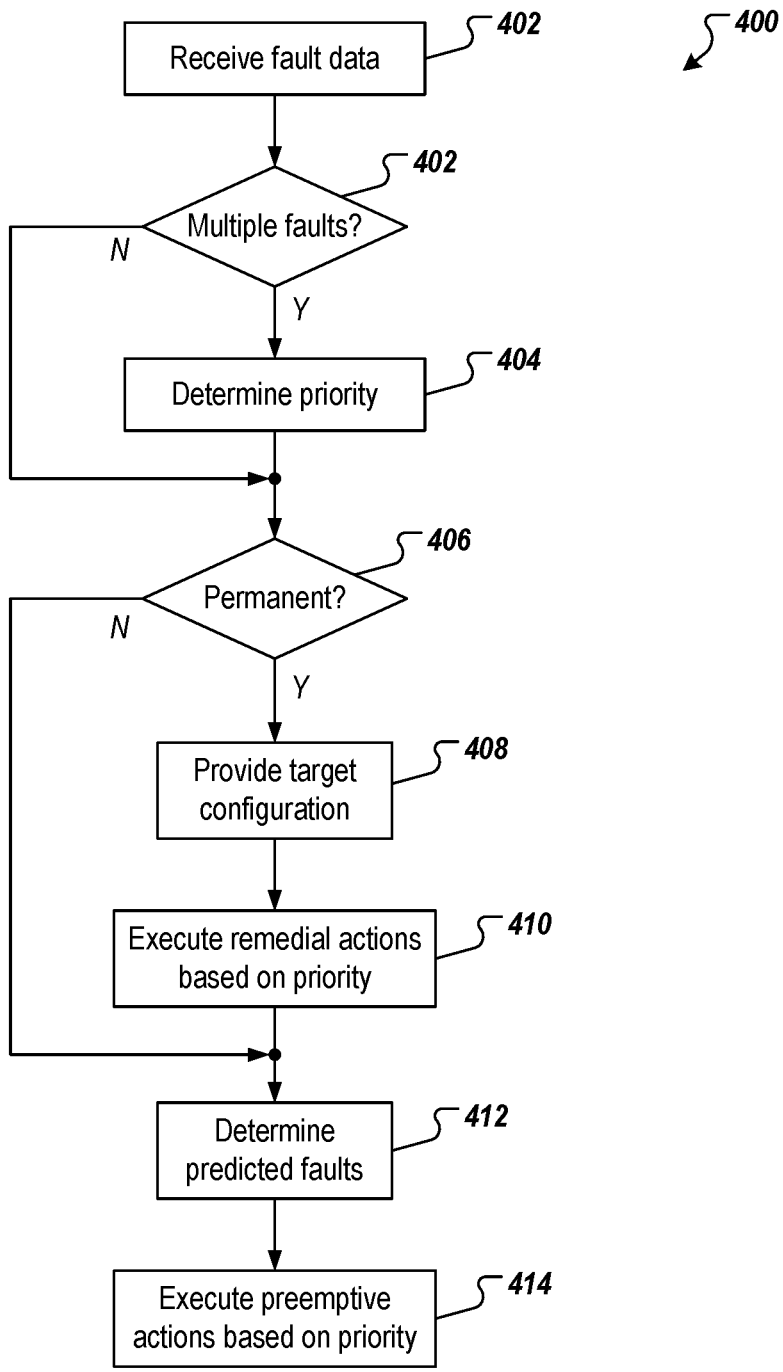
FIG. 4 depicts an example process that can be executed in accordance with implementations of the present disclosure.

In accordance with implementations of the present disclosure, nodes having errors are handled based on priority. For example, and as discussed above, FIG. 4 depicts an example process 400 that can be executed in accordance with implementations of the present disclosure. In some examples, the example process 400 is provided using one or more computer-executable program executed by one or more computing devices.

Fault data is received (402). For example, and as described in detail herein with reference to FIG. 2, the node detector controller and scanner 210 receives error events from each cluster 204 through respective API servers 226. In some examples, the node detector controller and scanner 210 periodically polls clusters 204 for error events (e.g., every Y milliseconds). In some examples, the node problem detector 220 reports error events to the API server 226 in response to detecting a fault. In some examples, the fault data includes one or more of a type of fault, a node identifier that uniquely identifies the node with the fault, a cluster identifier identifying a cluster 204 that the node resides in, and an application identifier identifying an application (or portion thereof) that is executed by the node.

It is determined whether multiple faults have occurred (402). For example, and as described in detail herein, multiple nodes can have concurrent faults. In some examples, the fault data indicates multiple error events and provides data representative of each error event. If multiple faults have occurred, priority is determined (404). For example, and as described in detail herein, the node detector and controller 210 can determine a priority level (e.g., designate priority value, usage-based error value) for each error event. In some examples, the priority level can be determined by using a node identifier as an index to a mapping to determine an application identifier (e.g., stored within the mapping) and determining a priority level associated with the application identifier (e.g., stored in memory).

It is determined whether the fault(s) is/are permanent (406). For example, and as described in detail herein, a permanent fault is at least partially remedied through node draining. For any permanent fault, target configuration information is provided (408) and one or more remedial actions are executed based on priority (410). For example, and as described in detail herein, fault data (among other data) can be input to a ML model that provides a target configuration as output. In some examples, remedial actions can include executing a node drain process by cordoning a faulty node, providing a new node based on the target configuration, and instantiating pods on the new node to execute respective instances of the application. If multiple nodes are faulty, nodes are handled in an order based on respective priority values, as described herein.

One or more predicted faults are determined (412). For example, and as described in detail herein, fault data (among other data) can be input to a ML model that provides one or more predicted faults and respective target configurations as output. In some examples, and as described herein, the ML model only outputs predicted faults having a likelihood that exceeds a threshold likelihood. In some examples, the fault data is representative of one or more permanent faults and/or one or more temporary faults, if any. One or more pre-emptive actions are executed based on priority (414). For example, and as described in detail herein, pre-emptive actions can include adjusting a configuration of one or more nodes and/or clusters to meet the target configuration(s). If multiple nodes/clusters are associated with faults, the pre-emptive actions are handled in an order based on respective priority values, as described herein.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for self-healing of clusters in a container orchestration system, the method being executed by one or more processors and comprising:
   receiving, by a self-healing platform within the container orchestration system, fault data that is representative of two or more error events occurring within a cluster provisioned within the container orchestration system;
   determining, by the self-healing platform, a set of actions to be executed in response to the two or more error events;
   providing, by the self-healing platform, a priority value for each error event of the two or more error events; and
   transmitting, by the self-healing platform, instructions to execute actions in the set of actions based on respective priority values of the two or more error events,
   wherein execution of actions in the set of actions comprises draining a faulty node, providing a new node, and configuring the new node, wherein the draining comprises:
   determining the faulty node based on the priority values of the two or more error events;
   issuing instructions to the faulty node to execute draining based on the priority values; and
   providing instruction for new node creation based on the issued instructions.

2. The method of claim 1, wherein determining, by the self-healing platform, a set of actions to be executed in response to the two or more error events comprises processing the fault data through a machine learning (ML) model, which provides actions in the set of actions as output.

3. The method of claim 1, wherein actions in the set of actions comprise actions to remediate a fault that has occurred within the cluster.

4. The method of claim 1, wherein actions in the set of actions comprise actions to pre-empt a predicted fault from occurring within the cluster.

5. The method of claim 4, wherein the actions in the set of actions are determined at least partially based on processing the fault data through a machine learning (ML) model, which provides actions in the set of actions as output.

6. The method of claim 1, wherein each priority value comprises one or more of a designated priority value and a usage-based priority value.

7. A non-transitory computer-readable storage medium coupled to one or more processors and having instructions stored thereon which, when executed by the one or more processors, cause the one or more processors to perform operations for self-healing of clusters in a container orchestration system, the operations comprising:
   receiving, by a self-healing platform within the container orchestration system, fault data that is representative of two or more error events occurring within a cluster provisioned within the container orchestration system;
   determining, by the self-healing platform, a set of actions to be executed in response to the two or more error events;
   providing, by the self-healing platform, a priority value for each error event of the two or more error events; and
   transmitting, by the self-healing platform, instructions to execute actions in the set of actions based on respective priority values of the two or more error events,
   wherein execution of actions in the set of actions comprises draining a faulty node, providing a new node, and configuring the new node, wherein the draining comprises:
   determining the faulty node based on the priority values of the two or more error events;
   issuing instructions to the faulty node to execute draining based on the priority values; and
   providing instruction for new node creation based on the issued instructions.

8. The non-transitory computer-readable storage medium of claim 7, wherein determining, by the self-healing platform, a set of actions to be executed in response to the two or more error events comprises processing the fault data through a machine learning (ML) model, which provides actions in the set of actions as output.

9. The non-transitory computer-readable storage medium of claim 7, wherein actions in the set of actions comprise actions to remediate a fault that has occurred within the cluster.

10. The non-transitory computer-readable storage medium of claim 7, wherein actions in the set of actions comprise actions to pre-empt a predicted fault from occurring within the cluster.

11. The non-transitory computer-readable storage medium of claim 10, wherein the actions in the set of actions arc determined at least partially based on processing the fault data through a machine learning (ML) model, which provides actions in the set of actions as output.

12. The non-transitory computer-readable storage medium of claim 7, wherein each priority value comprises one or more of a designated priority value and a usage-based priority value.

13. A system, comprising:
a computing device; and
a computer-readable storage device coupled to the computing device and having instructions stored thereon which, when executed by the computing device, cause the computing device to perform operations for self-healing of clusters in a container orchestration system, the operations comprising:
receiving, by a self-healing platform within the container orchestration system, fault data that is representative of two or more error events occurring within a cluster provisioned within the container orchestration system;
determining, by the self-healing platform, a set of actions to be executed in response to the two or more error events;
providing, by the self-healing platform, a priority value for each error event of the two or more error events; and
transmitting, by the self-healing platform, instructions to execute actions in the set of actions based on respective priority values of the two or more error events,
wherein execution of actions in the set of actions comprises draining a faulty node, providing a new node, and configuring the new node, wherein the draining comprises:
determining the faulty node based on the priority values of the two or more error events;
issuing instructions to the faulty node to execute draining based on the priority values; and
providing instruction for new node creation based on the issued instructions.

14. The system of claim 13, wherein determining, by the self-healing platform, a set of actions to be executed in response to the two or more error events comprises processing the fault data through a machine learning (ML) model, which provides actions in the set of actions as output.

15. The system of claim 13, wherein actions in the set of actions comprise actions to remediate a fault that has occurred within the cluster.

16. The system of claim 13, wherein actions in the set of actions comprise actions to pre-empt a predicted fault from occurring within the cluster.

17. The system of claim 16, wherein the actions in the set of actions arc determined at least partially based on processing the fault data through a machine learning (ML) model, which provides actions in the set of actions as output.

18. The system of claim 13, wherein each priority value comprises one or more of a designated priority value and a usage-based priority value.

* * * * *